US008095002B2

(12) United States Patent
Miguel et al.

(10) Patent No.: US 8,095,002 B2
(45) Date of Patent: Jan. 10, 2012

(54) METHOD AND APPARATUS FOR DIAGNOSING PROBLEMS ON A TIME DIVISION MULTIPLE NETWORK ACCESS (TDMA) OPTICAL DISTRIBUTION NETWORK (ODN)

(75) Inventors: Joseph D. Miguel, Petaluma, CA (US); David A. DeLew, Rohnert Park, CA (US)

(73) Assignee: Tellabs Pataluma, Inc., Naperville, IL (US)

( * ) Notice: Subject to any disclaimer, the term of this patent is extended or adjusted under 35 U.S.C. 154(b) by 1532 days.

(21) Appl. No.: 11/514,461

(22) Filed: Aug. 31, 2006

(65) Prior Publication Data
US 2007/0237523 A1   Oct. 11, 2007

Related U.S. Application Data

(60) Provisional application No. 60/789,357, filed on Apr. 5, 2006.

(51) Int. Cl.
*H04B 10/08* (2006.01)
(52) U.S. Cl. ............... 398/17; 398/16; 398/15; 398/10; 398/71
(58) Field of Classification Search ............ 398/69–72, 398/38, 63, 171, 9, 10, 12, 15, 16, 17
See application file for complete search history.

(56) References Cited

U.S. PATENT DOCUMENTS

| | | | | |
|---|---|---|---|---|
| 4,883,954 A * | 11/1989 | Esser et al. | ............... | 250/227.12 |
| 5,805,982 A * | 9/1998 | Hulsebosch | ............... | 455/62 |
| 5,825,516 A * | 10/1998 | Walsh | ............... | 398/40 |
| 6,169,757 B1 * | 1/2001 | Merritt | ............... | 372/50.22 |
| 6,400,863 B1 * | 6/2002 | Weinstock et al. | ............... | 385/24 |
| 6,807,188 B1 | 10/2004 | Blahut et al. | | |
| 6,987,750 B2 * | 1/2006 | Soderkvist et al. | ............... | 370/337 |
| 6,990,412 B2 * | 1/2006 | Zhang | ............... | 702/40 |
| 7,881,607 B2 * | 2/2011 | DeLew et al. | ............... | 398/17 |
| 7,925,164 B2 * | 4/2011 | Sitton et al. | ............... | 398/72 |
| 2003/0052256 A1 * | 3/2003 | Spirin et al. | ............... | 250/227.11 |
| 2004/0181811 A1 * | 9/2004 | Rakib | ............... | 725/122 |
| 2004/0264604 A1 * | 12/2004 | Malette et al. | ............... | 375/340 |
| 2005/0031357 A1 * | 2/2005 | Soto et al. | ............... | 398/198 |
| 2005/0078721 A1 * | 4/2005 | Wu et al. | ............... | 372/38.01 |
| 2006/0018657 A1 * | 1/2006 | Oron et al. | ............... | 398/66 |

(Continued)

FOREIGN PATENT DOCUMENTS

| | | |
|---|---|---|
| EP | 0 585 087 A1 | 3/1994 |
| WO | WO 97/01896 | 1/1997 |
| WO | WO 97/05718 | 2/1997 |

*Primary Examiner* — Kenneth N Vanderpuye
*Assistant Examiner* — Hibret Woldekidan
(74) *Attorney, Agent, or Firm* — Hamilton, Brook, Smith & Reynolds, P.C.

(57) ABSTRACT

A method and corresponding apparatus for diagnosing problems on a time division multiple access (TDMA) optical distribution network (ODN) is provided. An example method may include: (i) measuring no-input signal power level on a communications path configured to carry upstream communications between multiple optical network terminals (ONTs) and an optical line terminal (OLT) in a passive optical network (PON) at a time no upstream communications are on the communications path from the ONTs to the OLT; (ii) comparing the measured no-input signal power level to a threshold; and (iii) generating a notification in an event the threshold is exceeded. Through the use of this method, faults in optical transmitters, such as bad solder joints, can be determined. Such faults may cause errors in parameters, such as ranging or normalization parameters, associated with communications. By determining the faults, the time required to resolve communications errors can be reduced.

17 Claims, 13 Drawing Sheets

U.S. PATENT DOCUMENTS

| | | |
|---|---|---|
| 2006/0093356 A1 | 5/2006 | Vereen et al. |
| 2006/0140639 A1* | 6/2006 | Effenberger .................. 398/159 |
| 2007/0127923 A1* | 6/2007 | Dalton et al. ................... 398/71 |
| 2007/0237188 A1* | 10/2007 | Miguel et al. ................. 370/907 |
| 2007/0264016 A1* | 11/2007 | DeLew ........................... 398/71 |
| 2007/0267189 A1* | 11/2007 | Wells .............................. 166/68 |
| 2009/0010643 A1* | 1/2009 | DeLew et al. ................... 398/17 |

* cited by examiner

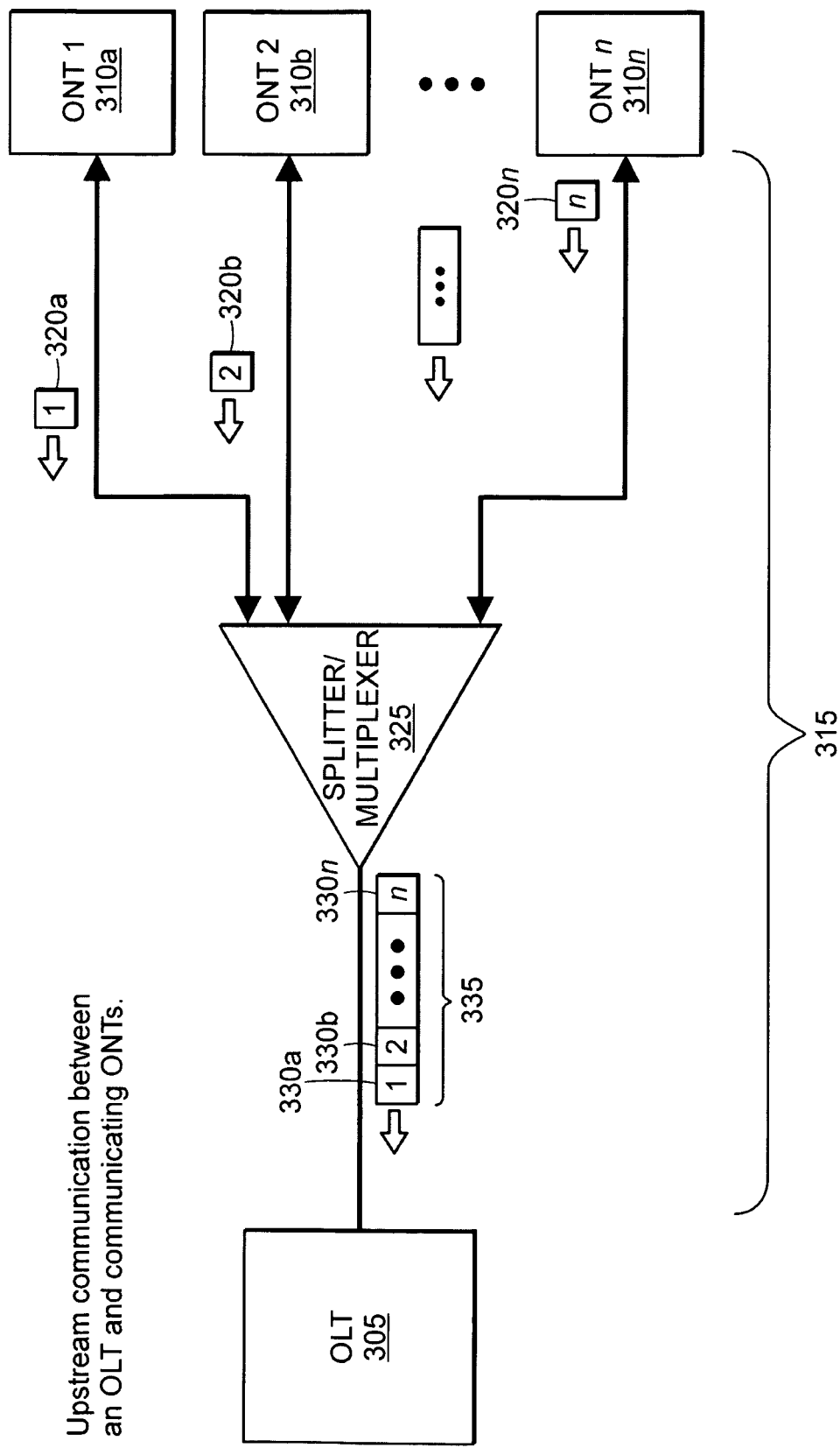

$t_{quiet} = t_{slot}$ $t_{quiet} = X \cdot t_{slot}$
X = whole multiple $t_{quiet} = Y \cdot t_{slot}$
Y = fraction

US 8,095,002 B2

METHOD AND APPARATUS FOR DIAGNOSING PROBLEMS ON A TIME DIVISION MULTIPLE NETWORK ACCESS (TDMA) OPTICAL DISTRIBUTION NETWORK (ODN)

RELATED APPLICATIONS

This application claims the benefit of U.S. Provisional Application No. 60/789,357 filed on Apr. 5, 2006, the entire teachings of which are herein incorporated by reference.

BACKGROUND OF THE INVENTION

A Passive Optical Network (PON) can contain multiple Optical Line Terminals (OLTs), each connected by a shared optical fiber to a respective Optical Distribution Network (ODN) with multiple Optical Network Terminals (ONTs) on individual optical fibers. ONTs can malfunction and interfere with communications between the ONTs and the OLT on a shared optical fiber. Such malfunctions are generally the result of power outages or typical communication systems errors or failures. Other disruptions in communications can be caused by optical fibers being cut, such as by a backhoe. If ONTs are malfunctioning for any other reason, identifying the issue requires a technician to inspect each ONT, possibly causing costly interruptions to service.

SUMMARY OF THE INVENTION

A method for diagnosing problems on a time division multiple access (TDMA) optical distribution network (ODN) is provided. A method according to an example embodiment of the invention includes: (i) measuring a no-input signal power level on a communications path configured to carry upstream communications between multiple optical network terminals (ONTs) and an optical line terminal (OLT) in a passive optical network (PON) at a time no upstream communications are on the communications path from the ONTs to the OLT; (ii) comparing the measured no-input signal power level to a threshold; and (iii) generating a notification in an event the threshold is exceeded.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating the principles of the invention.

FIG. 3A is block diagram illustrating layer 2 communications established between an optical line terminal (OLT) and optical network terminals (ONTs) in accordance with example embodiments of the invention;

DETAILED DESCRIPTION OF THE INVENTION

Figure 1:
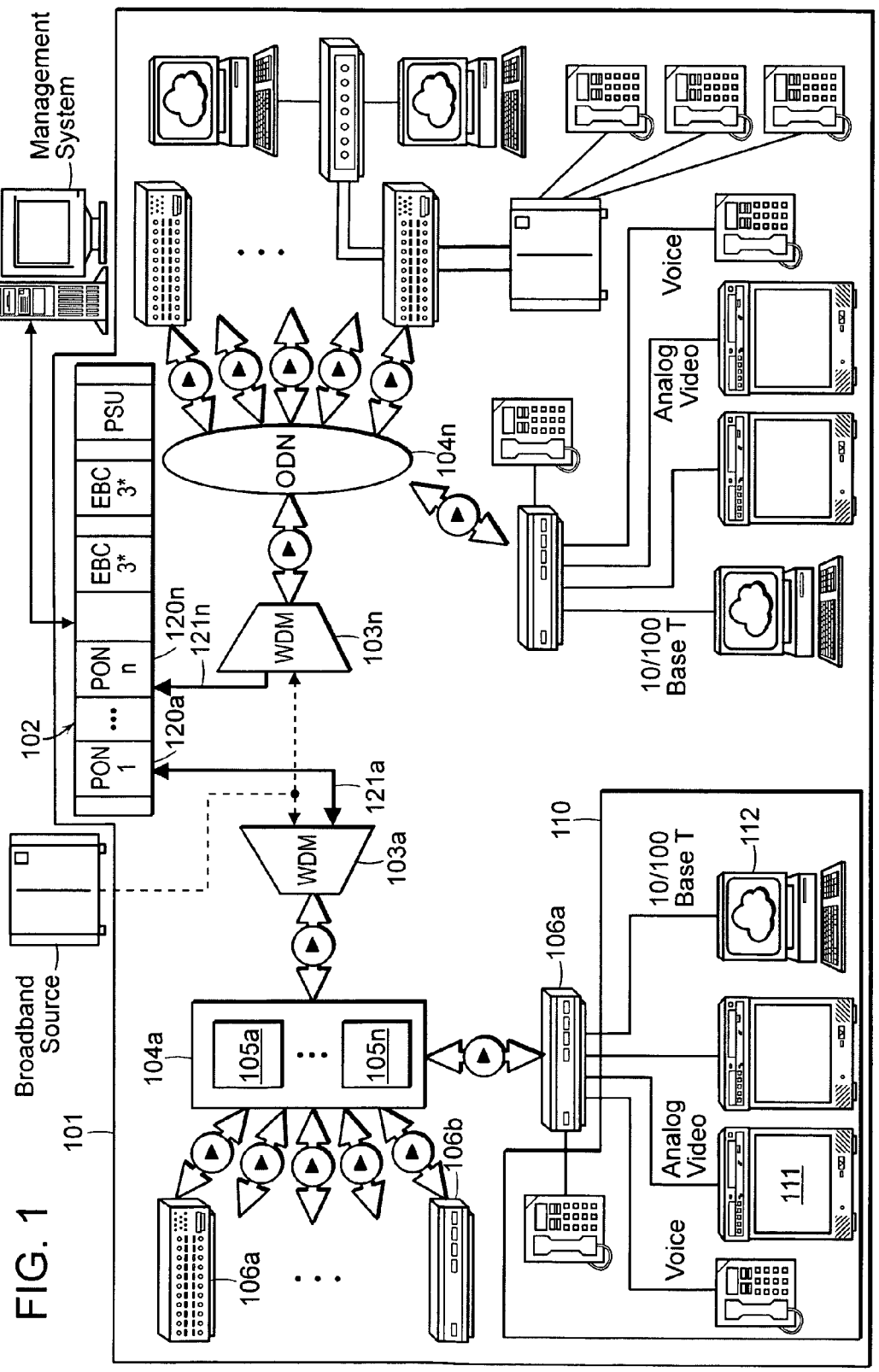
FIG. 1 is a network diagram of an exemplary passive optical network (PON)

A description of example embodiments of the invention follows.

An optical network terminal (ONT) can malfunction in such a way that it sends a continuous stream of light (e.g., low level, such as less than 10 dBm) up to a shared fiber of an optical distribution network (ODN). This can adversely affect communications between ONTs on the ODN and an optical line terminal (OLT). Using existing error detection techniques, such as those described in various passive optical network (PON) protocols, this type of ONT malfunction may not be detected. Even if it is detected (e.g., resulting from system failure), the ONT malfunction (i.e., output of continuous light at a low level) may not be identified, and field service engineers may spend a great deal of time inspecting a receiver in the OLT, fiber optic cables between the ONTs and OLT, and any relays or junctions between the ONTs and OLT. Moreover, the amount of continuously outputted light which can cause communications errors has been found to be very low. So, unless field service engineers are sensitive to the source of the communications errors, hours of lost network services can result.

Detection of an ONT sending a low level continuous stream of light up to a shared fiber of an ODN may be done several ways. One method may involve individually disconnecting ONTs from the ODN to determine if there is a single ONT or multiple ONTs causing the problem. With this method, however, the problem may not be corrected in a timely fashion. Additionally, this method requires considerable customer downtime. In another method, the OLT may be disconnected from the ODN, and the ODN may be examined with additional test equipment.

Accordingly, what is needed is a method or corresponding apparatus for diagnosing problems on an ODN which detects, prior to establishing layer 2 communications, a malfunctioning ONT by looking for an inappropriate presence of a modulated or unmodulated upstream optical signal when no signal should be present on the upstream communications path. Furthermore, after establishing layer 2 communications with any number of ONTs, a malfunctioning ONT may be detected by looking for an inappropriate presence of an unmodulated or very low level modulated upstream optical signal when no signal should be present on the upstream communications path.

As used herein, a modulated upstream optical signal is a signal which conveys information (i.e., communicates upstream communications data) and is interchangeably referred to herein as an "input signal"). The input signal may be either a "zero-bit input signal" (i.e., communicates a zero-bit) or a "one-bit input signal," i.e., communicates a one-bit. In contrast, an unmodulated upstream optical signal is a signal which does not convey information (i.e., communicates no upstream communications data) and is interchangeably referred to herein as a "no-input signal."

Further, power levels associated with a zero-bit input signal or a one-bit input signal are referred to herein as a "zero-bit input signal power level" or a "one-bit input signal power level," respectively. Additionally, a power level associated with a no-input signal is referred to herein as a "no-input signal power level."

In a PON system, multiple ONTs transmit data to an OLT using a common optical wavelength and fiber optic media. Field experience has demonstrated that a malfunctioning ONT can send an optical signal up to the OLT at inappropriate times, resulting in the OLT not being able to communicate with any of the ONTs on the ODN. A typical PON protocol provides some functionality for detecting this problem, but is limited only to inappropriate modulated signals. Consequently, the following ONT malfunctions are not being detected.

An example ONT malfunction not being detected involves an ONT sending a continuous upstream signal (modulated or unmodulated) up the fiber prior to attempting to establish communications with an OLT on an ODN. Another example ONT malfunction occurs when an ONT sends an unmodulated light signal up the fiber at an inappropriate time while attempting to establish communications or after having established communications with an OLT on an ODN. Consequently, an ability to detect whether a network contains an ONT with such a malfunction may depend on an ability to detect an unmodulated light signal.

While an OLT must be able to detect the presence of a modulated signal (or an input signal) in order to function as a node in a communications path, the ability to detect an unmodulated signal (or a no-input signal), however, is not required for operation. In accordance with example embodiments of the invention, the ability to detect an unmodulated upstream signal may improve the ability of the OLT to detect error conditions in upstream communications between ONTs and the OLT, as discussed hereinafter.

As such, in part, a difference between detecting a modulated versus an unmodulated upstream signal is that an optical receiver (or transceiver) does not have the ability to detect an unmodulated signal. In some cases, the optical receiver may not be able to detect or communicate the presence of an unmodulated upstream signal.

In other cases, even though the presence of an unmodulated signal may indicate a system problem, the presence of an unmodulated signal may not actually result in a problem in upstream communications between ONTs and an OLT. Sometimes the presence of an unmodulated upstream signal is removed by signal conditioning circuitry on the optical receiver (or transceiver). The unmodulated upstream signal adds a "DC" offset to a modulated upstream signal. The "DC" offset may be subsequently removed from the modulated upstream signal without corrupting it. Current experience, however, indicates that the effect of an unmodulated upstream signal on a modulated upstream signal varies from optical receiver to optical receiver. Additionally, the effect of the unmodulated upstream signal depends on the brightness or amplitude of the unmodulated upstream signal FIG. 1 is a network diagram of an exemplary passive optical network (PON) 101. The PON 101 includes an optical line terminal (OLT) 102, wavelength division multiplexers 103a-n, optical distribution network (ODN) devices 104a-n, ODN device splitters (e.g., 105a-n associated with ODN device 104a), optical network terminals (ONTs) (e.g., 106-n corresponding to ODN device splitters 105a-n), and customer premises equipment (e.g., 110). The OLT 102 includes PON cards 120a-n, each of which provides an optical feed (121a-n) to ODN devices 104a-n. Optical feed 121a, for example, is distributed through corresponding ODN device 104a by separate ODN device splitters 105a-n to respective ONTs 106a-n in order to provide communications to and from customer premises equipment 110.

The PON 101 may be deployed for fiber-to-the-business (FTTB), fiber-to-the-curb (FTTC), and fiber-to-the-home (FTTH) applications. The optical feeds 121a-n in PON 101 may operate at bandwidths such as 155 Mb/sec, 622 Mb/sec, 1.25 Gb/sec, and 2.5 Gb/sec or any other desired bandwidth implementations. The PON 101 may incorporate asynchronous transfer mode (ATM) communications, broadband services such as Ethernet access and video distribution, Ethernet point-to-multipoint topologies, and native communications of data and time division multiplex (TDM) formats. Customer premises equipment (e.g., 110) which can receive and provide communications in the PON 101 may include standard telephones (e.g., Public Switched Telephone Network (PSTN)), Internet Protocol telephones, Ethernet units, video devices (e.g., 111), computer terminals (e.g., 112), digital subscriber line connections, cable modems, wireless access, as well as any other conventional device.

A PON 101 includes one or more different types of ONTs (e.g., 106a-n). Each ONT 106a-n, for example, communicates with an ODN device 104a through associated ODN device splitters 105a-n. Each ODN device 104a-n in turn communicates with an associated PON card 120a-n through respective wavelength division multiplexers 103a-n. Wavelength division multiplexers 103a-n are optional components which are used when video services are provided. Communications between the ODN devices 104a-n and the OLT 102 occur over a downstream wavelength and an upstream wavelength. The downstream communications from the OLT 102 to the ODN devices 104a-n may be provided at 622 megabytes per second, which is shared across all ONTs connected to the ODN devices 104a-n. The upstream communications from the ODN devices 104a-n to the PON cards 120a-n may be provided at 155 megabytes per second, which is shared among all ONTs connected to ODN devices 104a-n.

Error conditions in upstream communications between an optical line terminal (OLT) and optical network terminals (ONTs) often result in layer 2 communication errors, for example, errors in ranging or normalization parameters. One such error condition in upstream communications is the presence of an unmodulated signal (or a no-input signal) on an upstream communications path. An example solution to this problem may include detecting the presence of an unmodulated signal on the upstream communications path, identifying whether the detected unmodulated signal leads to a layer 2 communications error, and communicating the error condition so that it may be corrected. An unmodulated signal on the upstream communications path may be detected by measuring a power level associated with the unmodulated signal. For the sake of readability, the power level associated with the unmodulated signal is referred to herein as a "no-input signal power level" and is used throughout this disclosure.

Figure 2:
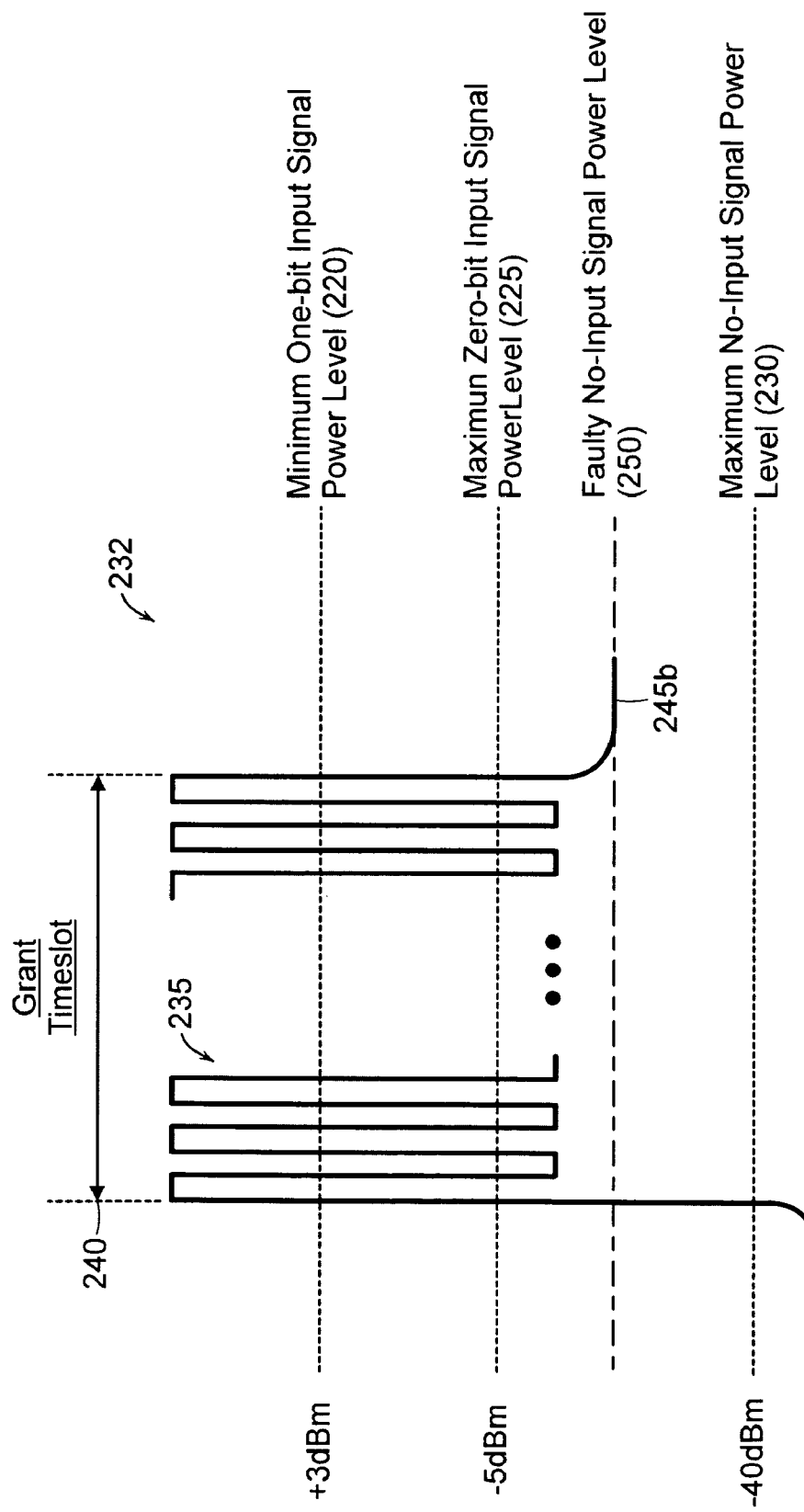
FIG. 2 is a power level diagram illustrating power levels associated with an input signal and a no-input signal in accordance with example embodiments of the invention.

FIG. 2 illustrates three power levels: a minimum logical one input signal power level 220, a maximum logical zero input signal power level 225, and a maximum no-input signal power level 230. The terms logical one and logical zero are interchangeably referred to herein as a one-bit and a zero-bit.

In general, when the power level of an input signal is above the minimum logical one input signal power level 220, the input signal is designated as a logical one input signal. When the power level of an input signal is below the maximum logical zero input signal power level 225, the input signal is designated as a logical zero input signal. When the power level of an input is below the minimum logical one input signal power level 220 but above the maximum logical zero input signal power level 225, the input signal is indeterminate, i.e., the input signal is neither a logical one input signal nor is the input signal a logical zero input signal.

In this way, by modulating or otherwise changing the power level of an input signal, the input signal can either convey a logical one input signal or a logical zero input signal. Moreover, by modulating the power level of an input signal, the input signal conveys information. Accordingly, upstream communications between an ONT and OLT on an upstream communications pathway is accomplished by modulating the power level of an input signal to an optical transmitter generating optical signals.

In contrast, when the power level of a signal is not modulated, the signal conveys no information. This is the case when there are no upstream communications between an ONT and an OLT on an upstream communications pathway. In this disclosure, the term no-input signal is used to describe a signal whose power level is not modulated. Furthermore, the terms unmodulated signal and no-input signal are used interchangeably throughout this disclosure.

When the power level of a no-input signal is below the maximum no-input signal power level 230, a no-input signal is said to be valid or non-faulty. More specifically, a no-input signal with a power level less than the maximum no-input signal power level 230 does not or is less likely to cause an error condition. On the other hand, when the power level of a no-input signal is above the maximum no-input signal power level 230, the no-input signal is said to be invalid or faulty. In contrast to a no-input signal with a power level less than the maximum no-input signal power level 230, a no-input signal with a power level greater than the maximum no-input signal power level 230 does or is more likely to cause an error condition (described later in greater detail).

Still referring to FIG. 2, consider the following illustrative example. The minimum logical one input signal power level 220 is +3 dBm (decibel-milliwatt), the maximum logical zero input signal power level 225 is −5 dBm, and the maximum no-input signal power level 230 is −40 dBm.

An input signal 232 with a series of power levels 235 is received during a grant timeslot 240. During the grant timeslot 240, the input signal 232 has power levels which at times are greater than +3 dBm and at times are less than −5 dBm. Thus, the series of power levels 235 in the input signal 232 designates a series of logical ones and logical zeros. Before the grant timeslot 240, a first no-input signal portion 245a of the input signal 232 has a power level less than −40 dBm. As such, the first no-input signal portion 245a of the input signal 232 is not faulty, i.e., validly conveys no information.

In contrast, after the grant timeslot 240, a second no-input signal portion 245b of the input signal 232 has a power level greater than −40 dBm, e.g., a "faulty no-input signal level" 250. In this case, the second no-input signal portion 245b of the input signal 232 is faulty, i.e., invalidly conveys no information. Discussed later in greater detail, a no-input signal having a power level, such as the faulty no-input signal power level 250, may lead to problems in upstream communications, e.g., errors in ranging and normalization parameters.

FIG. 3A illustrates upstream communications between an OLT 305 and communicating ONTs 310a-n over an upstream communications path 315. Upstream communications begins when the communicating ONTs 310a-n transmit upstream communications data 320a-n on the upstream communications path 315. Upstream communications data 320a-n are then combined on the upstream communications path 315 by a splitter/multiplexer 325. Upstream communications data 320a-n are transmitted by the communicating ONTs 310a-n at respective predefined times and in the case of a time division multiplexing (TDM) communications protocol, placed into individual timeslots 330a-n of an upstream communications frame 335.

The OLT 305, via the upstream communications path 315, receives the upstream communications frame 335. The OLT 305 may then demultiplex (i.e., separate) the upstream communications frame 335 into individual timeslots 330a-n. As a result, the OLT 305 receives respective upstream communications data 320a-n from each communicating ONT 310a-n.

Figure 3B:
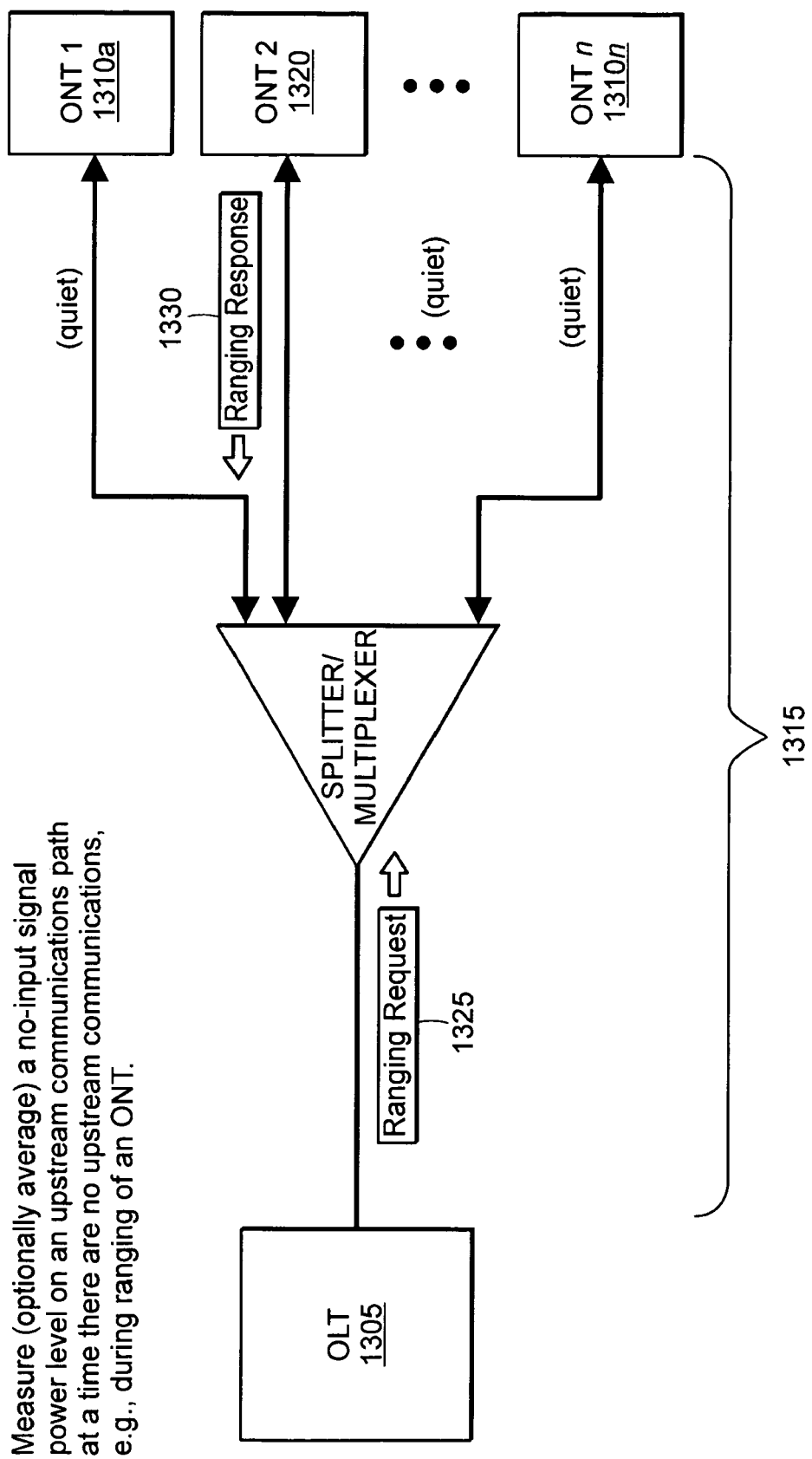
FIG. 3B is a network block diagram illustrating measuring a no-input signal power level on an upstream communications path prior to establishing layer 2 communications between an optical line terminal (OLT) and an optical network terminal (ONT) in accordance with example embodiments of the invention.

FIG. 3B is a network block diagram illustrating how an OLT 1305 may measure a power level of a no-input signal (or a no-input signal power level) on an upstream communications path 1315 at a time there are no upstream communications between the OLT 1305 and communicating ONTs 1310a-n. The no-input signal power level on the upstream communications path 1315 may be measured at a time the OLT 1305 is ranging an ONT 1320 or at another time there are no upstream communications on the upstream communications path 1315, e.g., when the OLT 1305 is immediately rebooted and before any ONTs are ranged.

In an example embodiment, the OLT 1305 may instruct all communicating ONTs 1310a-n to halt upstream communications in order to range the ONT 1320. With upstream communications from the communicating ONTs 1310a-n halted, the no-input signal power level on the upstream communications path 1315 should be small, (e.g., a power level below the maximum no-input signal power level 230 of FIG. 2) or have no value. Typically, once halted, any power present on the upstream communications path 1315 is caused by, for example, very low level leakage of optical transmitters (e.g., laser diodes) in transmitter units of the communicating ONTs 1310a-n or due to typical optical noise developed or imparted onto the upstream communications path 1315.

The OLT 1305 may send the ONT 1320 a ranging request 1325. The ONT 1320, in turn, may respond with a ranging response 1330. During the ranging, the no-input signal power level on the upstream communications path 1315 is measured during period(s) the ranging response 1330 is not on the upstream communications path 1315. As such, the no-input signal power level is not increased by a signal representing the ranging response 1330. If the no-input signal power level is greater than, for example, the maximum no-input signal power level 230 of FIG. 2, the ONT 1320 is faulty.

The ranging exchange between the OLT 1305 and the ONT 1320 may occur over a period of time known as a ranging window (not shown, but discussed below in reference to FIG. 6B). The measured no-input signal power level on the upstream communications path 1315 may be averaged over an un-allocated grant window (not shown). In addition to measuring a no-input signal power level during the un-allocated grant window, a no-input signal power level may also be measured before any ONTs have been ranged, e.g., when the OLT 1305 is rebooted.

Figure 3C:
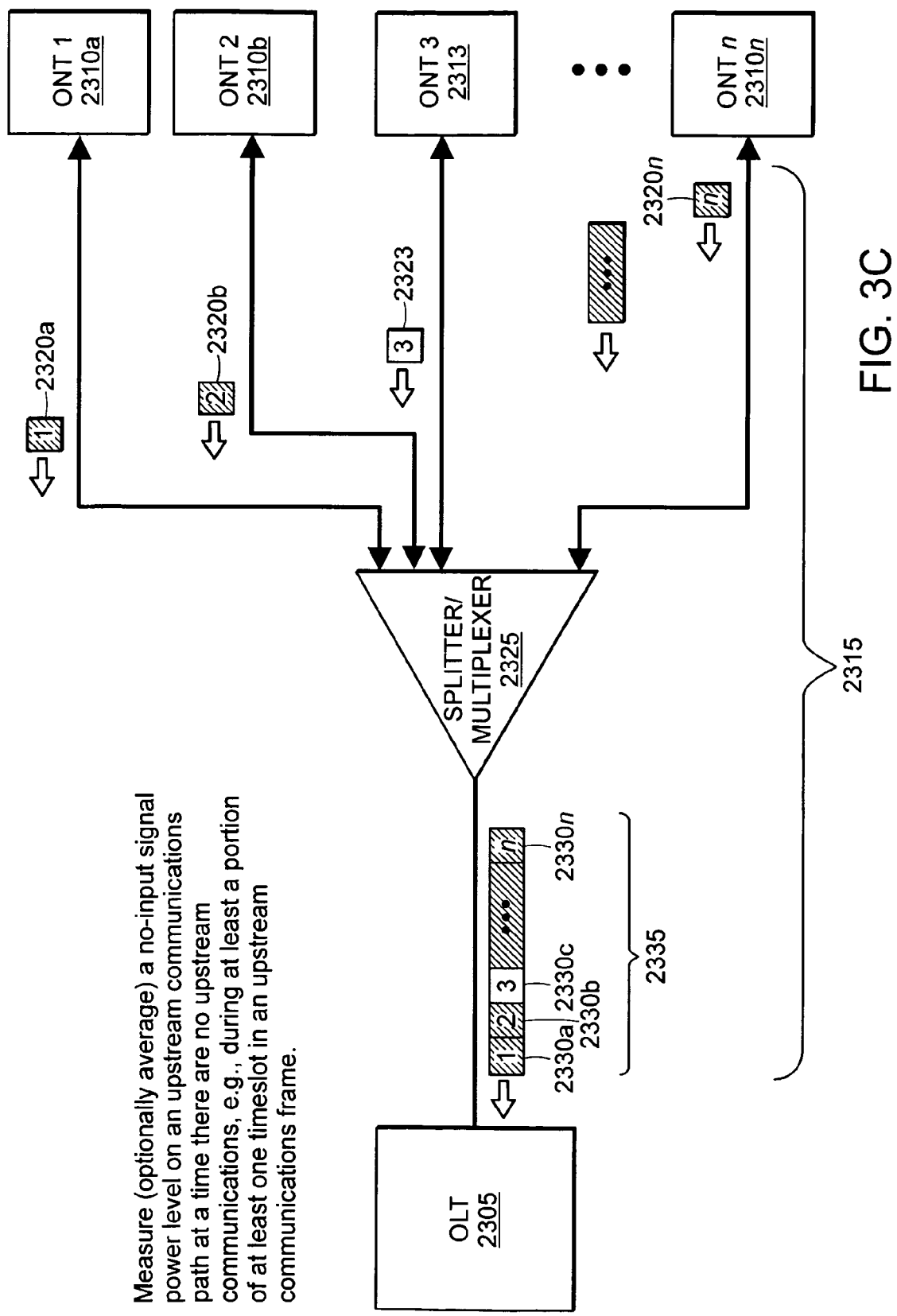
FIG. 3C is a network block diagram illustrating measuring a no-input signal power level on an upstream communications path after establishing layer 2 communications between an optical line terminal (OLT) and optical network terminals (ONTs) in accordance with example embodiments of the invention.

FIG. 3C is a network block diagram in which upstream communications between an OLT 2305 and communicating ONTs 2310*a-n* are carried over an upstream communications path 2315. In addition to the communicating ONTs 2310*a-n*, there is a non-communicating ONT 2313. Upstream communications begin with the communicating ONTs 2310*a-n* sending upstream communications data 2320*a-n* via the upstream communications path 2315. The non-communicating ONT 2313 may have no-data to send. Consequently, rather than sending upstream communications data 2320, nothing is sent, denoted by a "no-data" indicator 2323. For purposes of explaining aspects of the invention, the "no-data" indicator 2323 indicates a timeslot portion that is neither filled with an "idle" signal or a substantive upstream communications signal. The upstream communications data 2320*a-n* and the no-data 2323 are then combined by splitter/multiplexer 2325. The upstream communications data 2320*a-n* and the no-data 2323 are transmitted in their respective timeslots 2330*a-n* of upstream communications frame 2335.

The OLT 2305, via the upstream communications path 2315, receives the upstream communications frame 2335. The OLT 2305 then demultiplexes (or separates) the upstream communications frame 2335 into individual timeslots 2330*a-n*. Consequently, the OLT 2305 receives from each communicating ONT 2310*a-n* upstream communications data 2320*a-n*. The OLT 2305 also "receives" the no-data 2323 from the non-communicating ONT 2313.

While the OLT 2305 is "receiving" the no-data 2323 in the timeslot 2330*c* of the upstream communications frame 2335, a no-input signal power level on the upstream communications path 2315 may be measured. In another example embodiment, a no-input signal power level may be measured on an upstream communications path at a time there are no upstream communications for least a portion of at least one timeslot in an upstream communications frame.

In contrast to the previous example, the non-communicating ONT 2313 may send an "idle" signal (not shown) or a message indicating there is no data to be sent (not shown). In this situation a no-input signal power level on the upstream communications path 2315 cannot be measured.

Figure 4A:
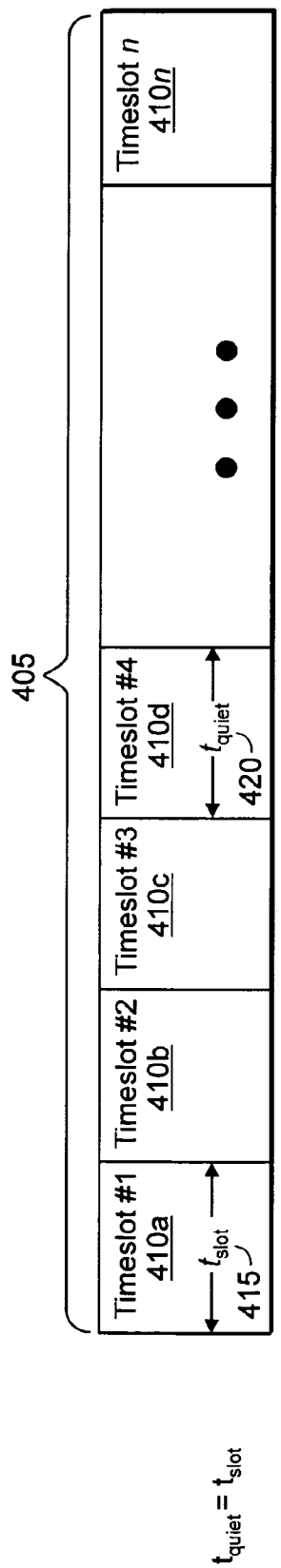
FIGS. 4A-4C are upstream communications frames illustrating example embodiments of measurements of a no-input signal power level on an upstream communications path being measured during a time there are no upstream communications.

FIG. 4A is an example embodiment of the invention in which an upstream communications frame 405 has n number of timeslots 410*a-n*. Each timeslot 410*a-n* grants (or allocates) a time for upstream communications 415 (referred to herein as $t_{slot}$). It is during the $t_{slot}$ 415 that upstream communications data is communicated from an ONT to an OLT. In the upstream communications frame 405, an "unused" timeslot (i.e., a timeslot without upstream communications data) defines a time for no-upstream communications 420 (referred to herein as $t_{quiet}$). It is during the $t_{quiet}$ 420 that a no-input signal power level on an upstream communications path may be measured. An unused timeslot such as $t_{quiet}$ 420 may occur in networks with more timeslots than ONTs.

In this example embodiment, the $t_{quiet}$ 420 is equal to the $t_{slot}$ 415. As such, if the $t_{slot}$ is 1.2 µs, for example, the no-input signal power level on an upstream communications path may be measured for as long as 1.2 µs.

Figure 4B:
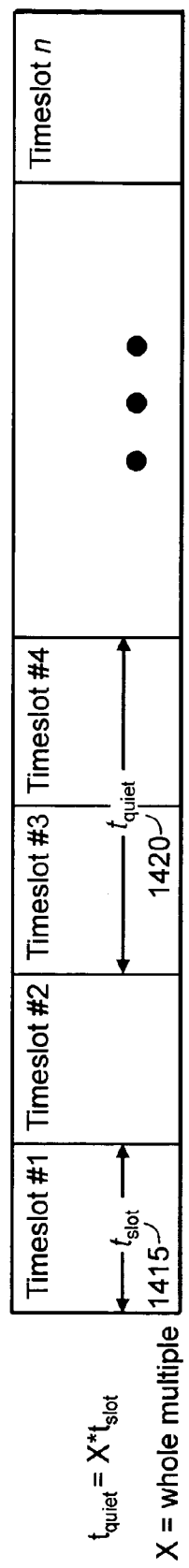

FIG. 4B is another example embodiment illustrating a time for no-upstream communications 1420 (referred to herein as $t_{quiet}$) optionally equal to some whole multiple of a time for upstream communications 1415 (referred to herein as $t_{slot}$).

For example, if the $t_{slot}$ 1415 is 1.2 µs, the $t_{quiet}$ 1420 may be two, three, etc., times the length of the $t_{slot}$ 1415. Accordingly, a no-input signal power level on an upstream communications path is measured for 2.4 µs, 3.6 µs, etc., where the longer time typically results in improved accuracy of the power level measurement.

Figure 4C:
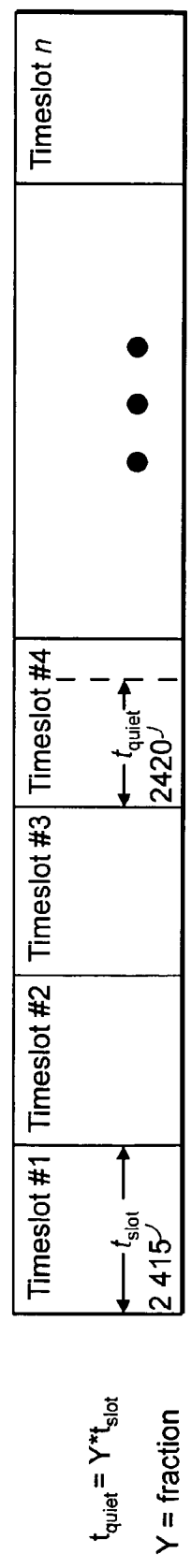

FIG. 4C is yet another example embodiment in which a time for no-upstream communications 2420 (referred to herein as $t_{quiet}$) is equal to some fraction of a time for upstream communications 2415 (referred to herein as $t_{slot}$). For example, if the $t_{slot}$ 2415 is 1.2 µs, the $t_{quiet}$ 2420 may be a quarter, one and half, etc. times the length of the $t_{slot}$ 2415. Accordingly, a no-input signal power level on an upstream communications path may be measured for 0.3 µs, 1.8 µs, etc.

In still yet other example embodiment, a no-input signal power level on an upstream communications path may be measured during a time there are no upstream communications (e.g., $t_{quiet}$ 1420 or when no communications frames are communicated in an upstream direction) and then averaged, resulting in an averaged measurement, to increase noise immunity. By measuring a no-input signal power level on an upstream communications path at a time there are no upstream communications, an error condition of very small optical power levels can be detected. Having detected such an error condition, a determination may be made as to whether the error condition may lead to layer 2 communications errors, such as errors in the ranging or normalization parameters.

Figure 5:
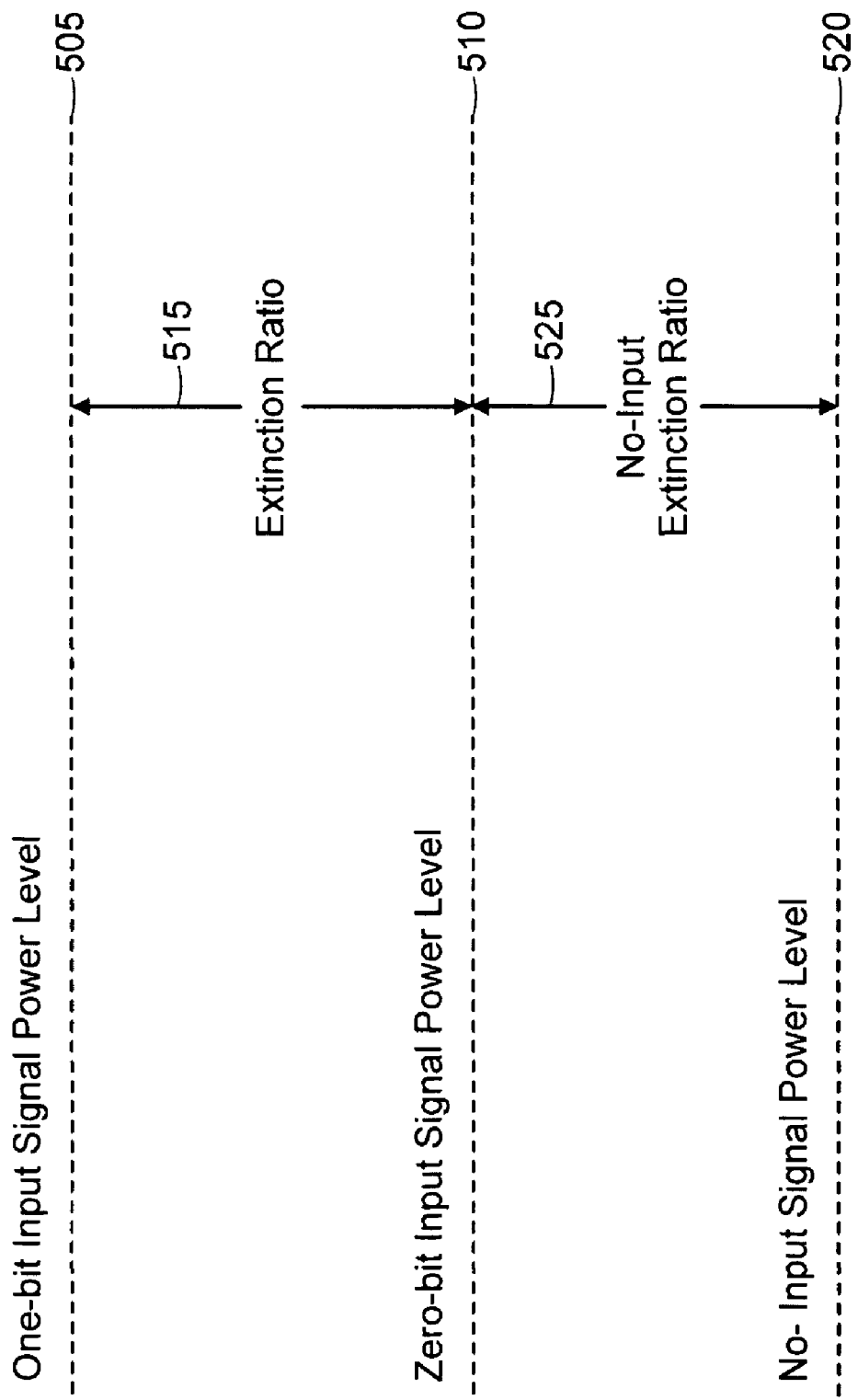
FIG. 5 is a power level diagram illustrating an extinction ratio and no-input extinction ratio in accordance with example embodiments of the invention.

FIG. 5 illustrates a ratio between a one-bit input signal power level 505 and a zero-bit input signal power level 510. This ratio is referred to herein as an extinction ratio 515. The extinction ratio 515 is a measure of a contrast (or a distinction) between power levels of input signals designating a one-bit input signal and a zero-bit input signal. For example, if the extinction ratio 515 is large, the distinction between a one-bit input signal power level and a zero-bit input signal power level is also large. Because the distinction between the power levels is large, an optical receiver has an easier task in detecting an input signal as either a one-bit input signal or a zero-bit input signal. In contrast, if the extinction ratio 515 is small, the distinction between a one-bit input signal power level and a zero-bit input signal power level is also small, and an optical receiver has a more difficult task in detecting an input signal as either a one-bit input signal or a zero-bit input signal.

A similar ratio may be said to exist between the zero-bit input signal power level 510 and a no-input signal power level 520. This ratio is referred to herein as a no-input extinction ratio 525. Like the extinction ratio 515, the no-input extinction ratio 525 is a measure of a contrast (or a distinction) between a power level of an input signal designating a zero-bit input signal and a power level of a no-input signal. For example, if the no-input extinction ratio 525 is large, the distinction between a zero-bit input signal power level and a no-input signal power level is also large. Because the distinction between power levels is large, an optical receiver has an easier task in detecting a zero-bit input signal or a no-input signal. In contrast, if the no-input extinction ratio 525 is small, the distinction a zero-bit input signal power level and a no-input signal power level is also small, and an optical receiver has a more difficult task in detecting a zero-bit input signal or a no-input signal.

Difficulties in distinguishing between a no-input signal and a zero-bit input signal may also lead to difficulties in distinguishing between a one-bit input signal and a zero-bit input signal. As a consequence, there may be an increase in the number of bit errors which occur during normal communications. As such, it desirable to have a no-input extinction ratio which is sufficiently large enough to prevent such bit errors.

Figure 6A:
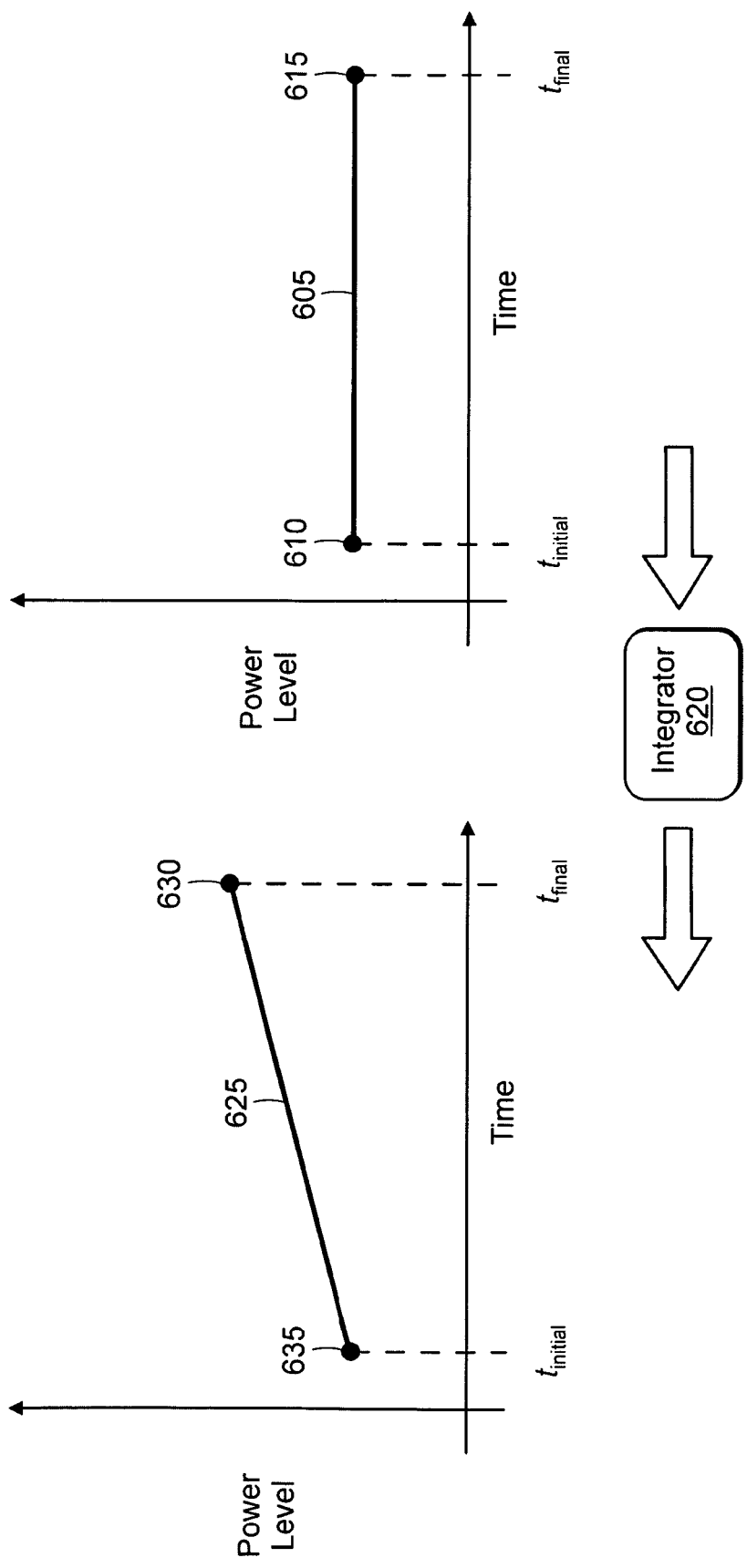
FIG. 6A is a power level diagram illustrating an integrated no-input signal power level ramping over time.

FIG. 6A is a power level diagram illustrating a no-input signal 605 which has a power level at time $t_{initial}$ 610 equal to a power level at time $t_{final}$ 615. The power level of the no-input signal 605 (i.e., no-input signal power level) may be integrated (or added) by an integrator 620 (or other electronics) in an optical power receiver (or transceiver) to produce an integrated no-input signal power level 625. The integrator 620 integrates from time $t_{initial}$ to time $t_{final}$, resulting in an integrated no-input signal power level at $t_{final}$ 630 being greater than an integrated no-input signal power level at $t_{initial}$ 635, as is expected. The longer the period of integration time, the higher the integrated no-input signal power level 625 is ramped (or increased). Consequently, over time, a no-input extinction ratio (see FIG. 5) becomes smaller, and it is more difficult to distinguish a no-input signal from a zero-bit input signal. Further, the higher the integrated no-input signal power level at $t_{initial}$ 635, the more significant the resulting integrated no-input signal power level 625 becomes over time and the smaller a no-input extinction ratio becomes over the same time.

Figure 6B:
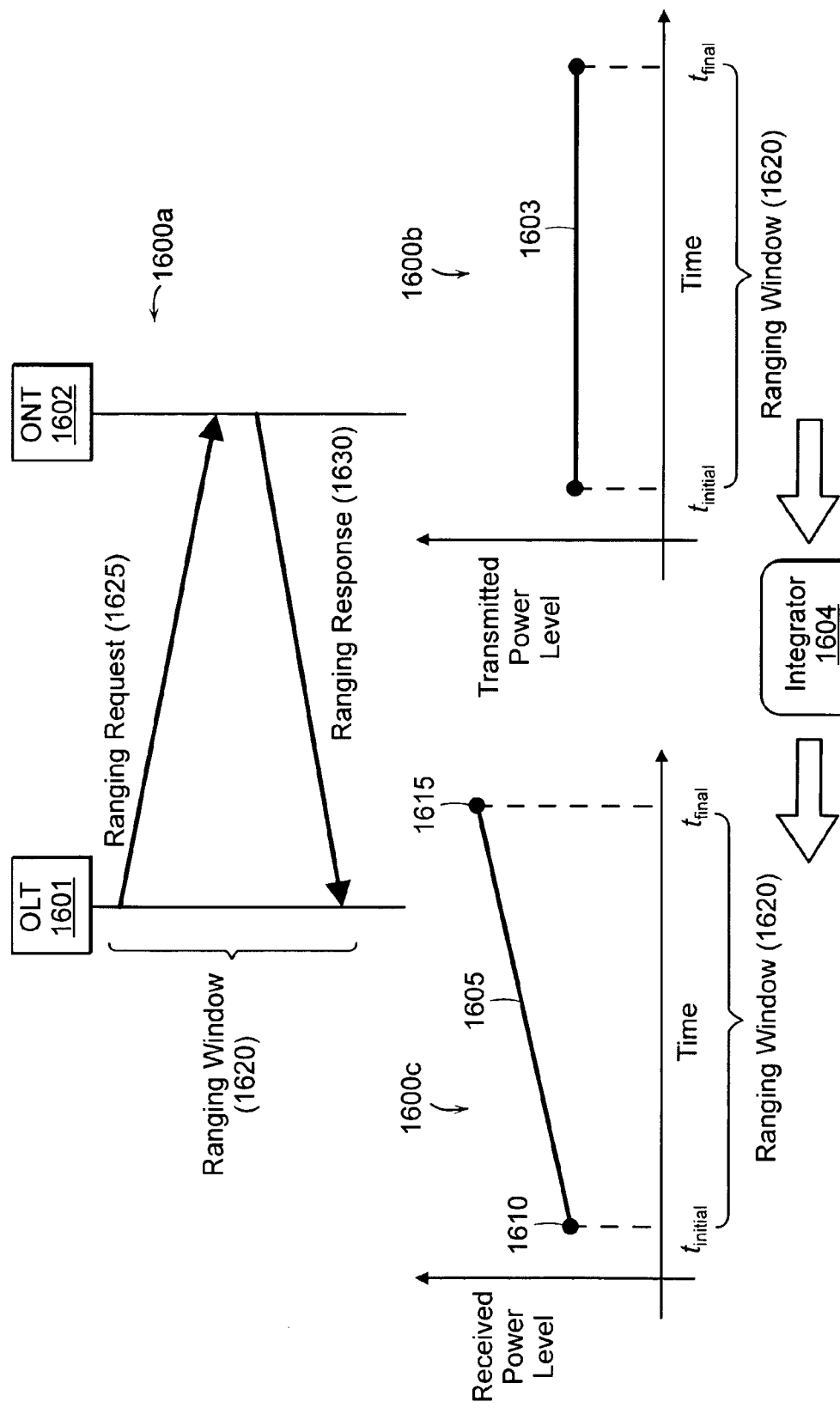
FIG. 6B is a timing diagram illustrating an integrated no-input signal power level ramping over a ranging window.

FIG. 6B is a diagram illustrating how a transmitted optical power level from a faulty ONT affects measurement during ranging of an ONT by an OLT. A message diagram 1600a illustrates an exchange of ranging messages between an OLT 1601 and an ONT 1602 during a ranging window 1620. A transmitted power level versus time plot 1600b illustrates the ONT 1602 transmitting a no-input signal power level 1603 during the ranging window 1620. A received power level versus time plot 1600c illustrates the OLT 1601 receiving the no-input signal power level 1603, which has been integrated by an integrator 1604 in a receiver (not shown) of the OLT 1604, as an integrated no-input signal power level 1605.

The transmitted power level versus time plot 1600b indicates that the no-input signal power level 1603 may be constant during the ranging window 1620, where the constant level may be a normal low level (e.g., −40 dBm) or a faulty high level (e.g., between −30 dBm and −25 dBm, or higher). The integrated no-input signal power level 1605 ramps up from an integrated no-input signal power level at time $t_{initial}$ 1610 to an integrated no-input signal power level at time $t_{final}$ 1615, over the ranging window 1620.

In operation, while the no-input signal power level 1603 is being integrated over the ranging window 1620, the OLT 1601 sends a ranging request 1625 to the ONT 1602. The ONT 1602, in turn, responds with a ranging response 1630. The OLT 1601, having sent the ranging request 1625, receives the ranging response 1630 from the ONT 1602 during the ranging window 1620 or it reports a ranging error.

Typically, the receiver of the OLT 1601 is reset between adjacent upstream timeslots to accommodate power levels which vary from ONT to ONT. During ONT ranging, however, an upstream timeslot is effectively enlarged to accommodate variability in supported fiber lengths, i.e., more than one timeslot is used for the ranging window 1620. For example, the ONT 1602 may be located up to 20 kilometers away from the OLT 1601. To accommodate this distance, the duration of the ranging window 1620 is set sufficiently long enough to allow the ONT 1602 located 20 kilometers away from the OLT 1601 to receive the ranging request 1625 and the OLT 1601 to receive the ranging response 1630.

When the duration of the ranging window 1620 is set for a long period of time, the receiver of the OLT 1601 is not reset during this period of time. As a result, no-input signal power levels from non-transmitting ONTs on the ODN have more time to be integrated by the receiver of the OLT 1601, thus increasing the integrated no-input signal power level 1605. This increase has a negative impact on a signal condition circuitry in the receiver of the OLT 1601. In other words, the longer the duration of the ranging window 1620, the greater the effects of a small no-input extinction ratio (see FIG. 5). Consequently, it may be difficult to distinguish between a zero-bit input signal power level and a one-bit input signal power level possibly leading to upstream communications problem(s).

In one embodiment of the present invention, prior to ranging an ONT, an OLT instructs communicating ONTs to halt upstream communications. Despite upstream communications being halted, there still may be a no-input signal from one or more halted ONTs causing a "faulty no-input signal power level" (see FIG. 2). Consequently, the faulty no-input signal power level may be integrated, causing the integrated no-input signal power level 1605 to increase further.

Figure 7A:
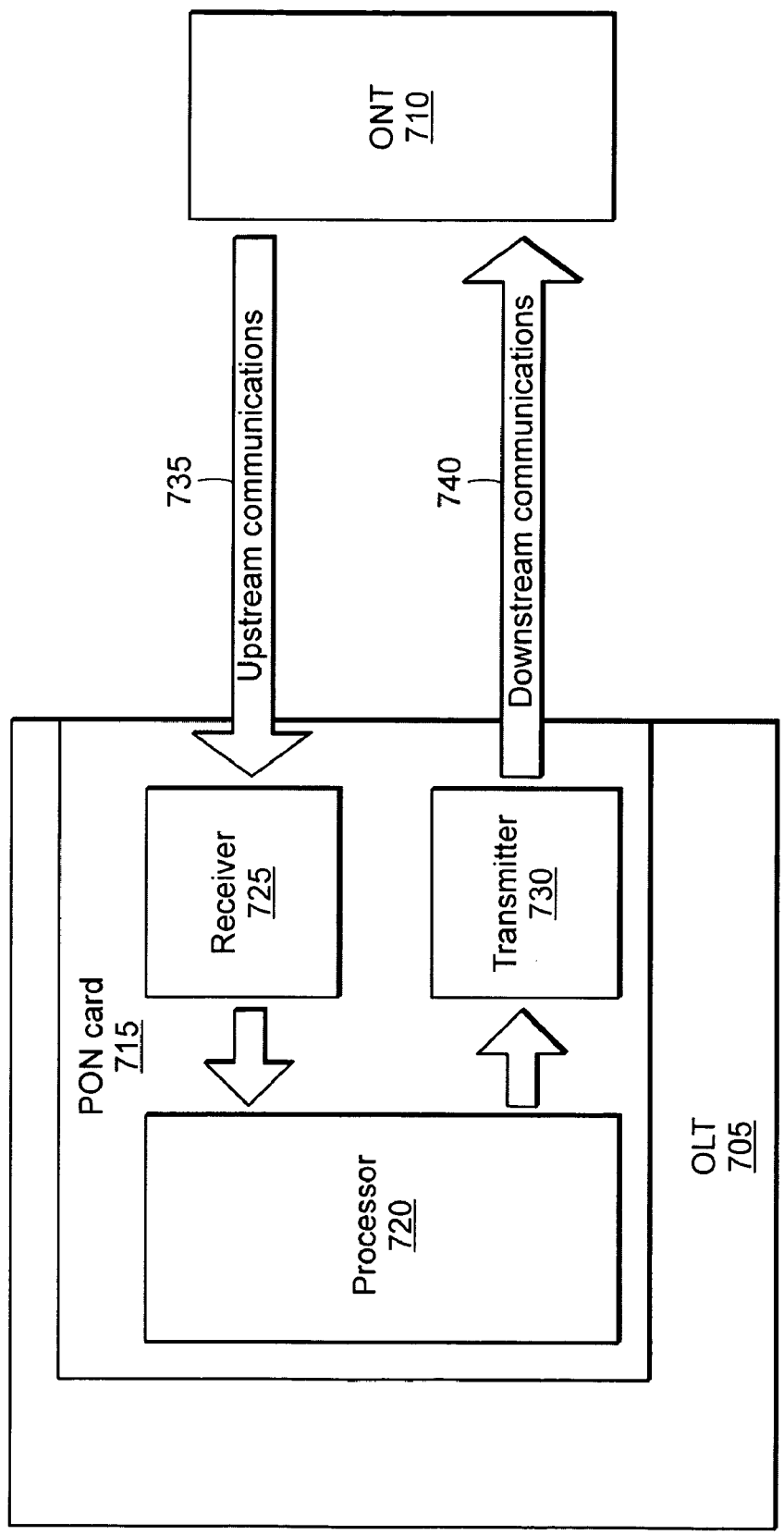
FIG. 7A is a block diagram of an exemplary optical line terminal (OLT)

FIG. 7A is a block diagram of an exemplary OLT 705 in communication with an ONT 710. In this particular example, the OLT 705 has a PON card 715. The PON card 715 includes a processor 720 communicatively coupled to a receiver 725 and a transmitter 730. Alternatively, the receiver 725 and the transmitter 730 may be integrated into a single transceiver (not shown). In the direction toward from the OLT 705, the receiver 725 (or transceiver) receives upstream communications 735. The processor 720 subsequently processes the upstream communications 735. In the opposite direction toward the ONT 710, the processor 720 sends, via the transmitter 730 (or transceiver), downstream communications 740.

Figure 7B:
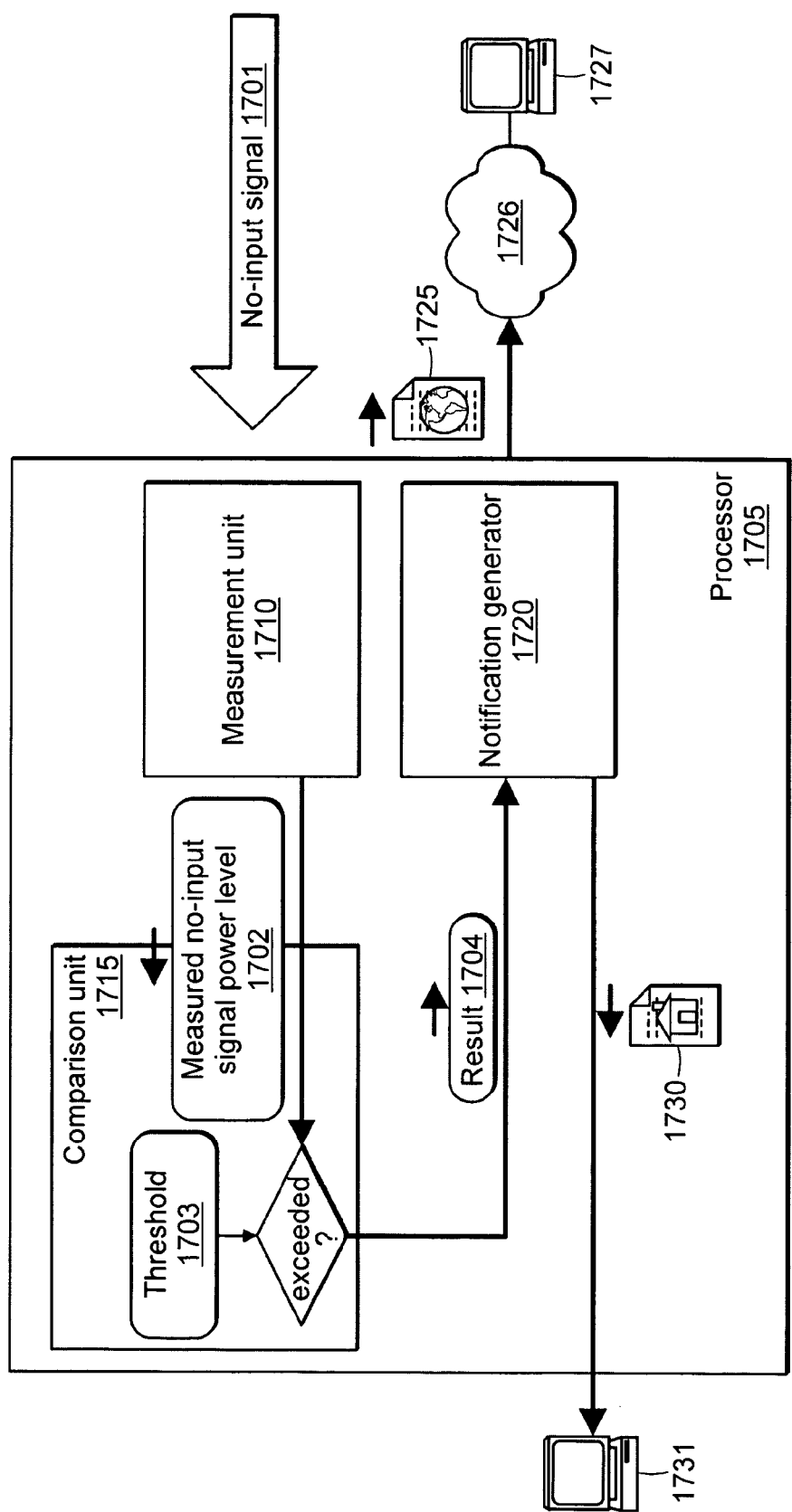
FIG. 7B is a block diagram of an exemplary processor supporting example embodiments of the invention.

FIG. 7B is a block diagram which illustrates an exemplary processor 1705, supporting example embodiments of the invention, operating in a PON card of an OLT. The processor 1705 may include a measurement unit 1710, a comparison unit 1715, and a notification generator 1720. Alternatively, some or all of the aforementioned components may not be co-located with the processor 1705, but may be remotely located connected via a communications bus (not shown).

In operation of this example embodiment, the measurement unit 1710 may measure a power level of a no-input signal 1701 on an upstream communications path. The measurement unit 1710 may include an integrator, such as the integrator 620 of FIG. 6A, or other electronics to measure the power level of the no-input signal 1701. A measured no-input signal power level 1702 may be compared against a threshold value 1703 by the comparison unit 1715. A result 1704 from the comparison unit 1715 is communicated to the notification generator 1720. The notification generator 1720 may generate a notification if the communicated result 1704 indicates the measured no-input signal power level 1702 exceeds the threshold 1703. Keeping the integrated no-input signal power levels of FIGS. 6A and 6B in mind, it should be understood that the comparison unit 1715 may compare a maximum, an average (at multiple times or over a length of time), or a portion of the measured no-input signal power level 1702 against the threshold 1703.

The threshold 1703 against which the measured no-input signal power level 1702 is compared may be determined or defined in multiple ways. For example, the threshold 1703 may be set to a value equal to a "tolerable no-input signal power level" multiplied by a number of ONTs in communication with the OLT. Field experience may indicate a no-input signal power level of −20 dBm to −30 dBm per ONT often leads to problems in upstream communications. Based on such experience, the tolerable no-input signal power level may be −40 dBm. Therefore, in an example network having thirty-two ONTs communicating with an OLT, the threshold may be calculated as −40 dBm multiplied by thirty-two. Additionally, losses between the ONTs and the OLT (i.e., ODN losses) may be accounted for in calculating the threshold. In another example embodiment, the tolerable no-input signal power level may be less than a zero-bit input signal power level specified for the ONTs. One skilled in the art will readily appreciate that the value of the tolerable no-input signal power level may not be fixed (i.e., set to the same level for all communications networks, but rather may depend on characteristics of a communications network.

The threshold 1703 may alternatively represent a maximum power level corresponding to a fault associated with upstream communications in a non-communicating state. In another example embodiment, the threshold 1703 may be less than a sum of a zero-bit input signal power level of each ONT offset by respective losses between the ONTs and the OLT. It should be understood that the threshold 1703 may be predetermined based on a configuration of a passive optical network or determined based on some other metric.

Continuing to refer to FIG. 7B, the notification generator 1720 may generate a remote notification 1725 which is sent over a network 1726 to, for example, a remote user or remote management system 1727. Alternatively, the notification generator 1720 may generate a local notification 1730, which is presented locally to, for example, a local user or local management system 1731. It should be understood that the remote notifications 1725 may be any form of signal (e.g., analog, digital, packet, and so forth), data values, including in header or load portions of packets, and so forth. The local notification 1730 may also be any form of signal or may be audio or visual alarms to alert an operator at a console at the OLT that an error as described herein had occurred.

Figure 8A:
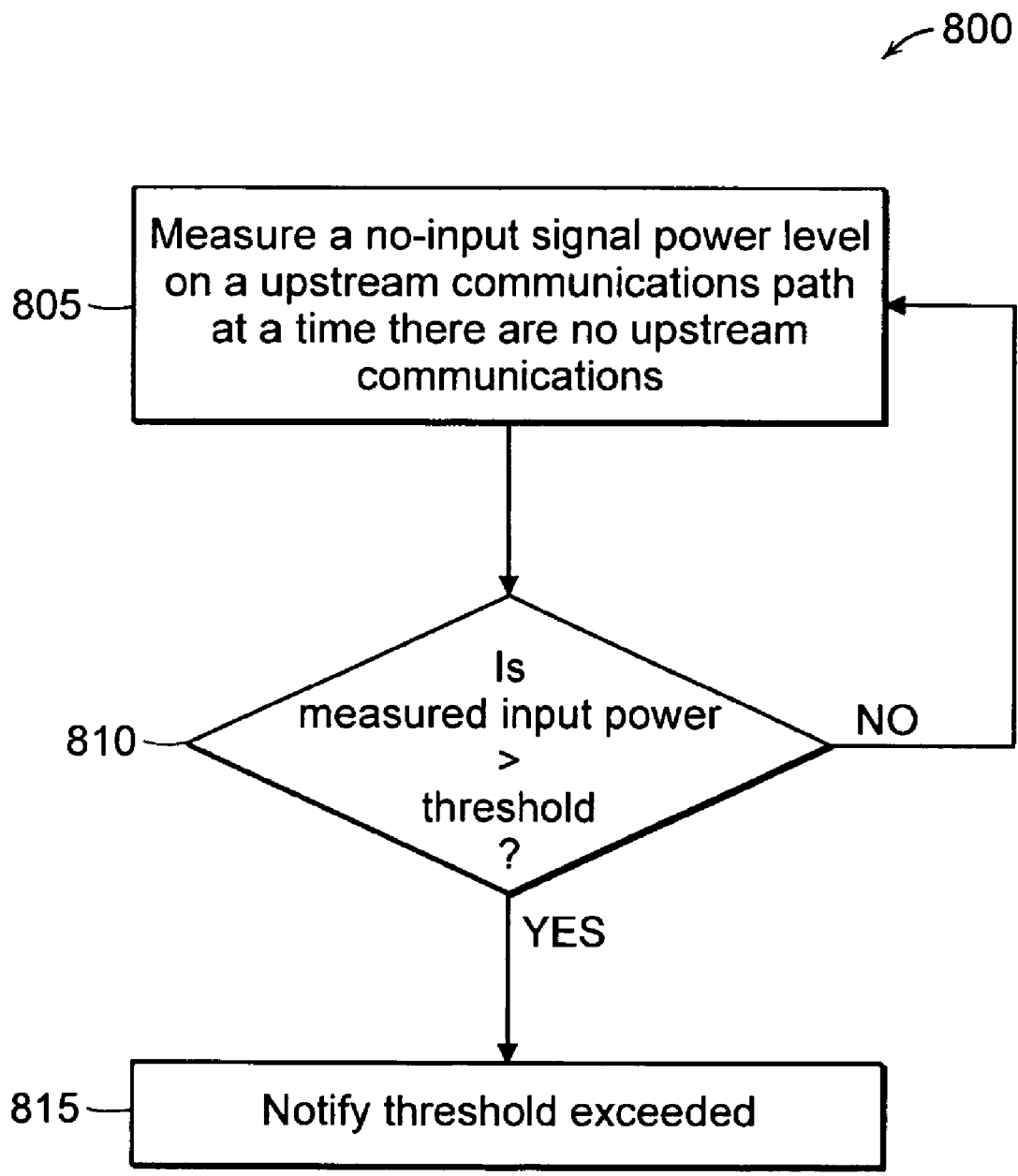
FIG. 8A is a flow diagram of an exemplary process performed in accordance with an example embodiment of the invention.

FIG. 8A is a flow diagram illustrating an exemplary process 800 for diagnosing a problem on an ODN. A no-input signal power level on an upstream communications path may be measured (805) at a time no upstream communications are on the upstream communications path. The measured no-input signal power level may be compared (810) against a threshold. If the measured no-input signal power level on the upstream communications path is greater than the threshold, a notification may be issued (815) to alert an operator (or management system) that the threshold is exceeded. If, however, the measured no-input signal power level on the upstream communications path is not greater than the threshold, the process 800 may return to begin measuring (805) the no-input signal power level.

Figure 8B:
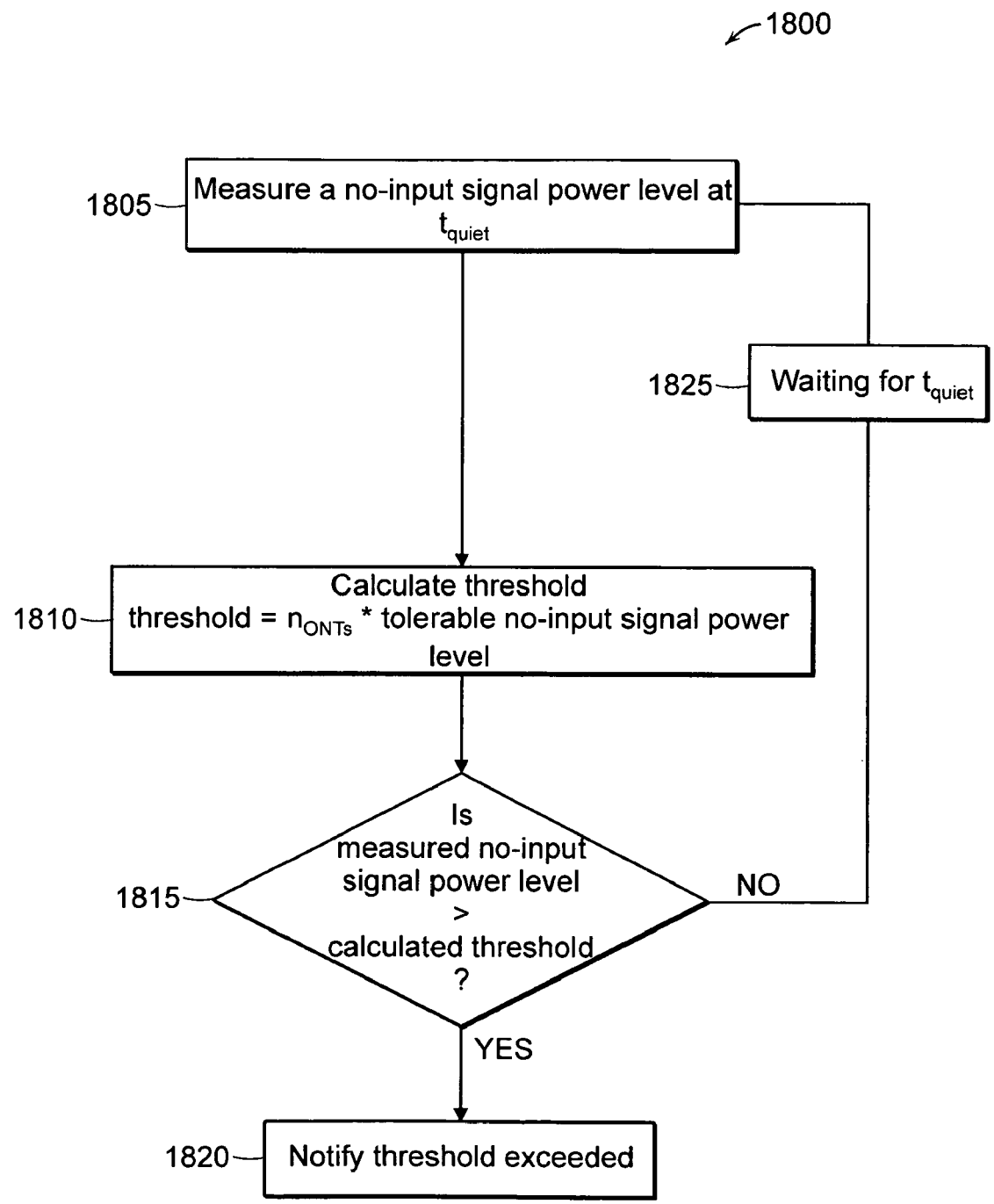
FIG. 8B is a flow diagram of an exemplary process performed in accordance with an example embodiment of the invention.

FIG. 8B is a flow diagram illustrating a process 1800 for diagnosing a problem on an ODN in accordance with an example embodiment of the invention. A no-input signal power level on an upstream communications path may be measured (1805) at a time no upstream communications are on the upstream communications path. In this example embodiment, the no-input signal power level is measured during a time for no upstream communications ($t_{quiet}$). In reference to FIGS. 4A-4C, the time for no upstream communications ($t_{quiet}$) may be equal to a time for upstream communications ($t_{slot}$). Alternatively, the time for no upstream communications ($t_{quiet}$) may be equal to a whole multiple or fraction of the time for upstream communications ($t_{slot}$).

Next, a threshold may be calculated (1810). In this example embodiment, the threshold is equal to a number of ONTs on the ODN multiplied by a tolerable no-input signal power level. The tolerable no-input signal power level may be estimated based on system modeling, equal to a value measured at a time known not be experiencing an error condition (e.g., initial system set-up), and so forth.

The measured no-input signal power level on the upstream communications path may be compared (1815) against the calculated threshold. If the measured no-input signal power level is greater than the calculated threshold, a notification may be issued (1820) that the calculated threshold is exceeded. If, however, the measured no-input signal power level on the upstream communications path is less than the calculated threshold, the process 1800 may wait (1825) for the time for no upstream communications ($t_{quiet}$) to reoccur. After waiting, the process 1800 may once again measure (1805) the no-input signal power level on the upstream communications path.

While this invention has been particularly shown and described with references to example embodiments thereof, it will be understood by those skilled in the art that various changes in form and details may be made therein without departing from the scope of the invention encompassed by the appended claims.

For example, although described as "cards" herein, it should be understood that PON cards, OLT cards, or ONT cards may be systems or subsystems without departing from the principles disclosed hereinabove.

Further, although described in reference to a passive optical network, the same or other example embodiments of the invention may be employed in an active optical network, data communications network, wireless network (e.g., between handheld communications units and a base transceiver station), or any other type of network.

The invention claimed is:

1. A method for detecting an error condition in a passive optical network (PON), the method comprising:
    measuring, with a measurement unit, a no-input signal power level on a communications path configured to carry upstream communications between multiple optical network terminals (ONTs) and an optical line terminal (OLT) in a passive optical network (PON) at a time no upstream communications are on the communications path from the ONTs to the OLT;
    comparing, with a comparison unit, the measured no-input signal power level to a threshold, wherein the threshold represents a tolerable no-input signal power level multiplied by a number of ONTs in communication with the OLT; and
    generating, with a notification generator, a notification in an event the threshold is exceeded.

2. The method of claim 1 wherein measuring the no-input signal power level includes averaging the no-input signal power level over a length of time.

3. The method of claim 1 wherein measuring the no-input signal power level includes measuring the no-input signal power level over a length of time defined by at least a portion of at least one timeslot in an upstream communications frame.

4. The method of claim 1 further comprising scheduling upstream communications in a manner defining a time when no upstream communications are presently scheduled to be on the communications path.

5. The method of claim 1 wherein the tolerable no-input signal power level is less than a zero-bit input signal power level for the ONTs.

6. The method of claim 1 wherein the threshold represents a maximum power level corresponding to a fault associated with upstream communications in a non-communicating state.

7. The method of claim 1 wherein the threshold is less than a sum of a zero-bit input signal power level of each ONT offset by respective losses between the ONTs and the OLT.

8. The method of claim 1 further comprising predetermining the threshold based on a configuration of the PON.

9. The method of claim 1 wherein generating the notification includes generating an alarm notification.

10. The method of claim 9 wherein generating the alarm notification includes transmitting the alarm notification across a network or presenting the alarm notification locally.

11. An apparatus for detecting an error condition in a passive optical network (PON), the apparatus comprising:
- a measurement unit operable to measures a no-input signal power level on a communications path configured to carry upstream communications between multiple optical network terminals (ONTs) and an optical line terminal (OLT) in a passive optical network (PON) at a time no upstream communications are on the communications path from the ONTs to the OLT;
- a comparison unit operable to compare the measured no-input signal power level to a threshold, wherein the threshold represents a tolerable no-input signal power level multiplied by a number of ONTs in communication with an OLT; and
- a notification generator operable to communicate with the comparison unit and generate a notification in an event the threshold is exceeded.

12. The apparatus of claim 11 further comprising a timer coupled to the measurement unit operable to enable the no-input signal power level to be measured over a length of time defined by at least a portion of at least one timeslot in an upstream communications frame.

13. The apparatus of claim 11 wherein the tolerable no-input signal power level is less than a zero-bit input signal power level for the ONTs.

14. The apparatus of claim 11 wherein the threshold represents a maximum power level corresponding to a fault associated with upstream communications in a non-communicating state tolerated by the OLT.

15. The apparatus of claim 11 wherein the comparison unit is operable to predetermines the threshold based on a configuration of the PON.

16. The apparatus of claim 11 wherein the notification generator is operable to generates an alarm notification which is transmitted across a network or is presented locally.

17. An apparatus for detecting an error condition in a passive optical network (PON), the apparatus comprising:
- means for measuring a no-input signal power level on a communications path configured to carry upstream communications between multiple optical network terminals (ONTS) and an optical line terminal (OLT) in a passive optical network (PON) at a time no upstream communications are on the communications path from the ONTs to the OLT;
- means for comparing the measured no-input signal power level to a threshold, wherein the threshold represents a tolerable no-input signal power level multiplied by a number of ONTs in communication with an OLT; and
- means for generating a notification in an event the threshold is exceeded.

* * * * *